W. JONES.
DOUBLE BOILER.
APPLICATION FILED APR. 8, 1921.
1,408,356.
Patented Feb. 28, 1922.
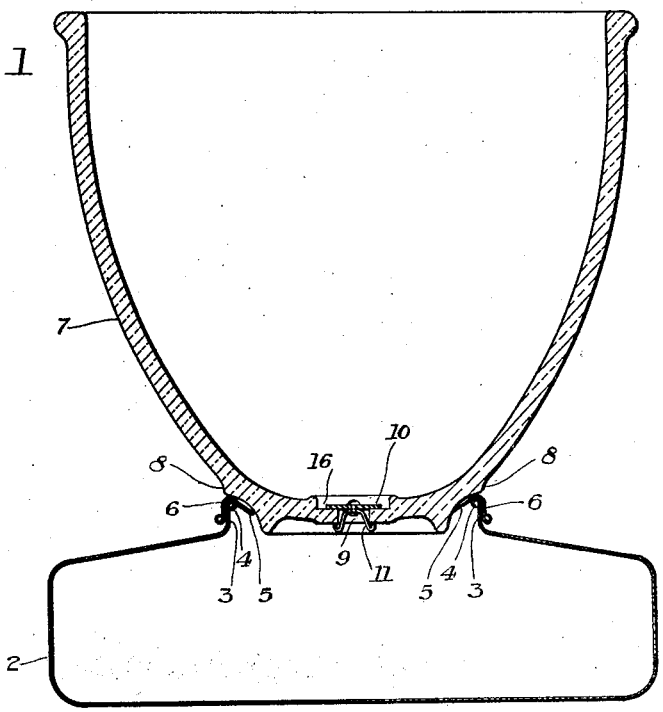
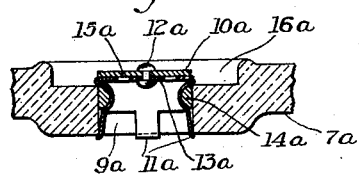
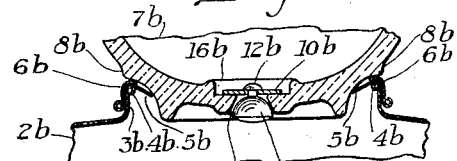
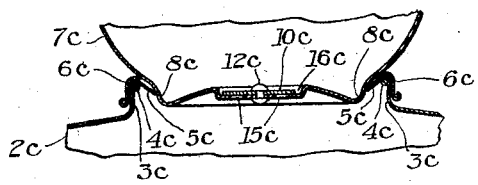
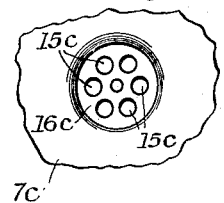
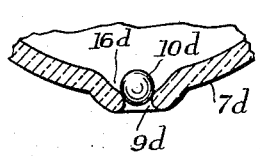
INVENTOR.
Will Jones
by C. M. Clarke
Attorney

UNITED STATES PATENT OFFICE.

WILL JONES, OF AVALON, PENNSYLVANIA.

DOUBLE BOILER.

1,408,356. Specification of Letters Patent. Patented Feb. 28, 1922.

Application filed April 8, 1921. Serial No. 459,689.

*To all whom it may concern:*

Be it known that I, WILL JONES, a citizen of the United States, residing at Avalon, in the county of Allegheny and State of Pennsylvania, have invented certain new and useful Improvements in Double Boilers, of which the following is a specification.

My invention consists of an improvement in double boilers for culinary use, and has for its object to provide a simple and efficient cooking utensil adapted for the cooking of food, and constructed in the manner more fully hereinafter described.

It comprises a base chamber or vessel for containing hot water and a superimposed cooking vessel set thereon with an intervening sealing means and a centrally located valve in the bottom of the cooking vessel adapted to admit steam thereinto.

In the drawings, showing certain preferred embodiments of the invention,

Fig. 1 is a view in central vertical section of the complete cooker;

Fig. 2 is a partial similar view showing a modified construction of the center valve;

Fig. 3 is a similar sectional view showing a further modification;

Fig. 4 is a similar view showing a metal cooking vessel and modified construction of valve;

Fig. 5 is a detail view of the valve seat; and

Fig. 6 is a sectional detail view showing a ball form of check valve for the cooking vessel.

Referring to the construction of Fig. 1, the base or supporting and water containing vessel 2 is made of sheet metal in any suitable form, circular or square, and provided at its upper portion with a contracted upwardly extending annular neck 3, preferably provided with a terminal annular beaded edge 4. A packing gasket 5 of rubber, leather, or other suitable flexible material is secured by its outer edge between the neck 3 and an outer surrounding annular clamping band 6, and extends inwardly and downwardly at a slight inclination, and is centrally apertured to receive the lower projecting bottom portion of the cooking vessel. Gasket 5, when engaged by the vessel, forms a practically air tight and steam tight fit against the vessel as to outward escape of steam, but capable of inward deflection under atmospheric pressure, whereby to admit entrance of air from the outside for renewal of any air exhaustion.

The cooking vessel 7, which may be of glass, porcelain, or other suitable ware, is of any suitable shape, preferably circular, in bowl form, and is mounted upon the upper annular edge portion of band 6 by a supporting annular abutment 8 of the cooking vessel itself. Inwardly thereof, the bottom portion of the vessel extends downwardly with a suitable tapering formation, whereby to interfit within the gasket 5, as shown, so as to make a closing seal therewith. At the middle portion, the cooking vessel is provided with a circulation port 9 upon the top of which is mounted a valve 10, which may conveniently be a disk of rubber or other suitable flexible material, adapted to seal against the surface surrounding the port 9 against passage inwardly of the contents of the cooker. Disk 10 is provided with a pair of inwardly extending resilient locking tongues 11 adapted to engage against the lower annular edge of port 9 and hold the disk 10 in position with facility for insertion and removal. As thus constructed, there is a tight closing seal formed between the gravitating contents of the cooker and the lower supporting water vessel 2, which will prevent the escape of the contents of the cooking vessel, but which will permit passage upwardly thereinto of any steam generated within the vessel 2. At the same time, the vessel is firmly supported around the upper edge of the lower vessel, and with ample provision for sealing the joint between the two in the manner described.

In the modification shown in Fig. 2, the construction generally is the same as before described, and the parts are similarly identified, except as to the central valve $10^a$. In this case, the flexible disk is secured by a central rivet $12^a$ to the upper flat face $13^a$ of the supporting base for the valve, which extends downwardly within port $9^a$ by a plurality of annular holding resilient tongues $11^a$. Immediately below the outer edge of the valve plate $13^a$, the depending portion is annularly recessed to provide for an inserted packing ring $14^a$ of rubber or the like, adapted to make a tight closing engagement within the upper annular wall portion of the middle port. Valve plate $13^a$ is provided with a series of transverse circulation ports $15^a$ around its center, allowing for the escape of steam upon upward pressure thereof, and adapted to be sealed by downward pressure of the flexible disk 10ª.

In Fig. 3 I show a further modification in which the sealing disk 10ᵇ operates in substantially the same manner as in Fig. 1, except that instead of being fixedly connected within the circulation port 9ᵇ it is provided with a centrally connected depending weight 11ᵇ having a terminal button 12ᵇ extending up through a central reduced opening in the valve and holding the valve to its seat by the gravity of the weight 11ᵇ. The construction and operation otherwise are the same as already described.

In Fig. 4, the cooking vessel 7ᶜ is shown as formed of a continuous sheet metal body bent to provide the supporting annular abutment 8ᶜ, the general conformation being otherwise similar to the outline of the bottom portion of vessel 7, 7ª and 7ᵇ. The sealing valve 10ᶜ in such case is connected with the central bottom supporting disk portion of the cooking vessel by a central rivet 12ᶜ, the disk portion being apertured by the series of openings 15ᶜ arranged around the center. In this construction, the valve 10ᶜ operates to seal the circulation ports against downward passage, but will open to admit upward flow of steam into the vessel, in the same manner as already described.

If preferred, an ordinary check valve 10ᵈ may be used, seated in a recess 16ᵈ of the vessel 7ᵈ, and closing the steam circulation port 9ᵈ, as shown in Fig. 6.

In all of the various constructions, it will be observed that the central valve is seated within a receiving recess 16, 16ª, etc., and while such construction is preferable in providing a surrounding protecting wall for the valve, so as to avoid interference with it by any of the contents of the cooking vessel, such recess is not absolutely necessary, and may be dispensed with, whereby to mount the valve directly upon the inner continuous surface. This feature and various others may, of course, be changed or modified in detail construction within the scope of the several claims.

The operation of the invention is as follows.

The vessel 2 being filled with water and placed upon a suitable heater, steam will be generated therein, and the resulting internal pressure will press the gasket 5 tightly around the tapering base of the cooking vessel. Steam, however, when sufficiently generated, may pass through port 9 by opening the valve 10, into the relatively cold contents of the cooking vessel, in which the steam will condense until the temperature thereof has been raised sufficiently high. In such case, the contents of the cooking vessel will boil or operate with sufficient cooking effect, in the same manner generally as the ordinary single boiler, but with the material advantage of remoteness from the fire.

When the water in vessel 2 ceases to boil and to generate steam, valve 10 will close, retaining the contents of the cooking vessel against escape. The gasket 5 operating as described, will admit air to compensate for any vacuum due to condensation, and it will be obvious that the gasket may be readily renewed upon being worn.

The invention is of especial value in connection with cooking operations in providing for the direct admission of steam to the contents of the cooker. It is comparatively simple in construction and very easily taken apart and cleaned, with resulting sanitation. It may be made in various sizes and capacities, and is capable of performing its functions in a highly satisfactory manner.

What I claim is:

1. A cooking utensil comprising a supporting water containing base having an annular sealing gasket, and a cooking vessel mounted thereon provided with an upwardly opening and downwardly closing sealing valve.

2. In combination, a water containing base having an upper annular supporting ring and an inwardly extending centrally apertured flexible gasket, and a cooking vessel mounted thereon having a downwardly extending sealing portion engaging the gasket and an upwardly opening valve.

3. In combination, a water containing base having an upper annular supporting ring and an inwardly extending centrally apertured flexible gasket, and a cooking vessel mounted thereon having a downwardly extending sealing portion engaging the gasket, and an upwardly opening removable valve provided with a temporary holding element.

4. In combination, a water containing base having an upper annular supporting ring and an inwardly extending centrally apertured flexible gasket, and a cooking vessel mounted thereon having a downwardly extending sealing portion engaging the gasket, and an upwardly opening removable valve provided with a centrally attached retaining device.

5. In combination with the bottom portion of a removable cooking vessel of the class described, adapted to be mounted above a water containing base with an intervening sealing gasket and provided with a circulation port and an upper bearing face; a flexible valve thereon provided with centrally connected retaining mechanism for holding it in position.

In testimony whereof I hereunto affix my signature.

WILL JONES.